United States Patent

Ehret

[15] 3,697,820
[45] Oct. 10, 1972

[54] TRANSIENT SUPPRESSION CIRCUIT FOR D. C. MOTOR DRIVE SYSTEM

[72] Inventor: Robert J. Ehret, Los Altos, Calif.

[73] Assignee: Beckman Instruments, Inc.

[22] Filed: Jan. 27, 1971

[21] Appl. No.: 110,011

[52] U.S. Cl. ........................... 317/148.5 B, 318/492
[51] Int. Cl. ............................................... H01h 47/32
[58] Field of Search .......... 317/DIG. 6, 11 E, 148.5 B; 321/47; 318/138, 492

[56] References Cited

UNITED STATES PATENTS 3,299,341  1/1967  Corey .......................... 321/47
3,325,715  6/1967  Jacoby ........................ 318/492

Primary Examiner—L. T. Hix
Attorney—Robert J. Steinmeyer and James M. Thomson

[57] ABSTRACT

A control circuit for a d.c. system including a transient suppression network connected in parallel with an inductive load and comprising a plurality of series connected, like poled, unidirectional current conducting elements, such as diodes, and an inductive impedance connected in parallel with at least one of the unidirectional current conductive elements.

4 Claims, 1 Drawing Figure

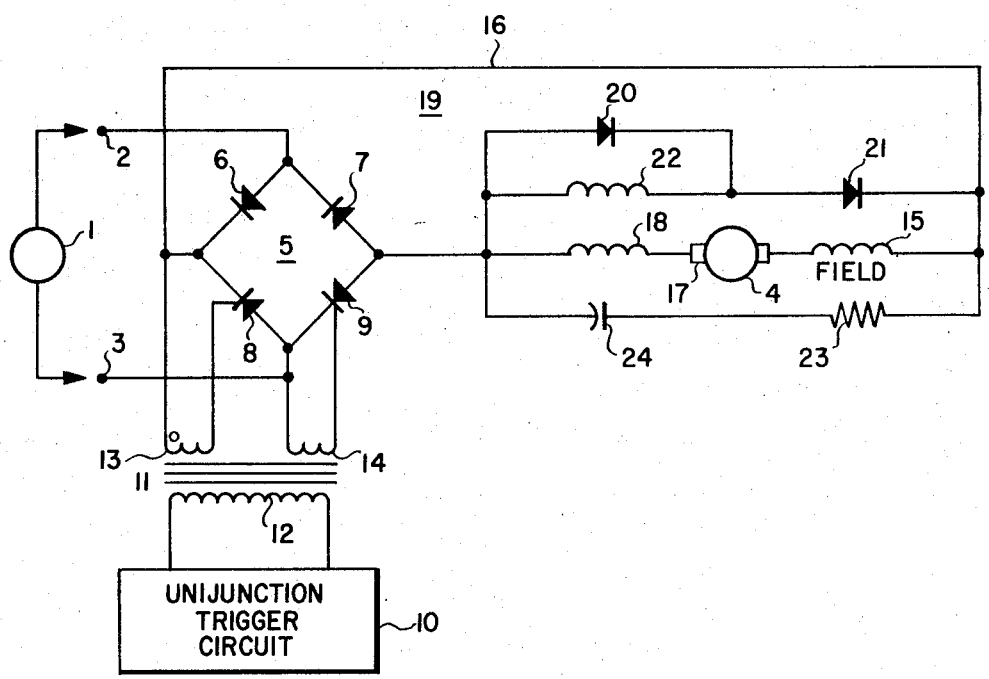
INVENTOR.
ROBERT J. EHRET

TRANSIENT SUPPRESSION CIRCUIT FOR D. C. MOTOR DRIVE SYSTEM

BACKGROUND OF THE INVENTION

1. Field of the Invention

This invention relates in general to control circuits for d.c. systems having an inductive load, such as a d.c. motor drive system, and more particularly to a signal transient suppression network for suppressing line transients arising from the gating of switching elements, such as silicon controlled rectifiers.

2. Description of the Prior Art

Present drive circuitry employed with a d.c. motor conventionally utilizes a pair of silicon controlled rectifiers (SCR's) in conjunction with a full wave bridge rectifying network with the SCR's being triggered into conduction on alternate half cycles of an a.c. line voltage input to provide a d.c. energizing signal to the motor. Triggering pulses for the SCR's are generally derived from a unijunction trigger circuit whose triggering time is dictated and controlled by a signal which is the function of the desired motor speed. In this manner the speed of the motor may be accurately controlled by merely varying the firing angle of the silicon controlled rectifiers.

It has been found that the gating of silicon controlled rectifiers utilized in such an environment may result in large line voltage and current transients. Such transients result in excessive power dissipation and may, and ofttimes do, lead to voltage breakdown and destruction of various circuit components.

SUMMARY

The present invention contemplates a transient suppression network for reducing large voltage and current transients which occur when gating switching elements, such as silicon controlled rectifiers, associated with a full wave rectifier network in a d.c. system having an inductive load. To this end there is provided a transient suppression network connected in parallel with the inductive load and comprising a plurality of series connected, like poled, unidirectional current conducting elements, such as diodes, and an inductive impedance connected in parallel with at least one of the unidirectional current conductive elements.

Accordingly, the primary object of the present invention is the provision of a transient suppression network in a d.c. circuit having an inductive load for reducing voltage and current transients caused by the gating of switching elements, such as silicon controlled rectifiers.

This and other objects and other advantages of the invention will become apparent from the following detailed description read in conjunction with the accompanying drawing in which:

DETAILED DESCRIPTION OF THE DRAWING

The sole FIGURE is a schematic diagram, partially in block form, of the present transient suppression network included in a control circuit for a series wound d.c. motor.

At the outset it should be emphasized that while for descriptive purposes the invention is illustrated and discussed in connection with a d.c. motor control system, it is contemplated that the invention may be employed as well in other d.c. systems having an inductive load and nothing in the following description should be construed to limit the invention to d.c. motor control systems.

Referring now to the drawing, it will be observed that the reference numeral 1 designates a source of a.c. line voltage which is adapted to be connected to input terminals 2 and 3 for providing energizing power to series wound d.c. drive motor 4. The a.c. energizing signal is coupled to d.c. motor 4 by way of a full wave bridge rectifier 5 and connecting line 6. Full wave bridge rectifier 5 includes two oppositely poled diodes 6 and 7, respectively, and two oppositely poled silicon controlled rectifiers (SCR's) 8 and 9, respectively.

Rectifier 5, in a manner well known in the art, rectifies the a.c. input signal waveform from a.c. source 1 to provide a d.c. energizing current which is applied to d.c. drive motor 4. SCR's 8 and 9 serve as signal gating means to vary the magnitude of the d.c. energizing current provided by rectifier 5. The firing angle of the SCR's 8 and 9 is controlled by pulses supplied from a unijunction trigger circuit 10 which pulses are impressed upon the gating electrode of each SCR 8 and 9 via the transformer 11 having a primary winding 12 connected to the trigger circuit 10 and a pair of secondary windings 13 and 14 connected between the gating and cathode electrodes of SCR's 8 and 9, respectively. By increasing or decreasing the firing angles of SCR's 8 and 9, the magnitude of the energizing current delivered to d.c. motor 4 may be accurately varied and the motor speed thereby controlled. A typical unijunction trigger circuit is shown and described in the General Electric SCR Manual, Section 8.6, FIG. 8,25, dated 1964.

Connecting line 16 serves to interconnect series connected field winding 15 and armature winding 17 of d.c. drive motor 4 in series with full wave bridge rectifier 5. An inductor 18 is also connected in a series with the field and armature windings 15 and 17 to assist in the reduction of the ripple of the d.c. energizing current.

A transient suppression network, designated generally by the reference numeral 19, is connected in parallel with the series connected field and armature windings 15 and 17, respectively, of d.c. drive motor 4. Transient suppression network 19 comprises a pair of serially connected, like poled, unidirectional current conducting elements 20 and 21, respectively, and an inductive impedance 22, consisting of an inductor, connected in parallel with unidirectional current conducting element 20. While in the illustrated embodiment unidirectional current conducting elements 20 and 21 comprise diodes, it will be appreciated by those skilled in the art that other appropriate unidirectional current conducting elements may be utilized. It is significant to note that diodes 20 and 21 are poled to be rendered conductive by the back e.m.f. generated in the armature winding when neither SCR 8 or 9 is gated on.

Finally, a series connected resistor 23 and capacitor 24 is connected in parallel with armature and field windings 17 and 15, respectively, of d.c. motor 4 to assist in the reduction of any voltage transients due to distributed power line inductance.

In operation the a.c. signal from source 1 is impressed across the input terminals of full wave bridge rectifier 5. On the positive half cycle of the a.c. signal d.c. current flows through diode 6, connecting line 16, field winding 15 and armature winding 17 of d.c. motor 4, inductor 18, and silicon controlled rectifier 9 to input terminal 3. On the negative half cycle of the a.c. signal, d.c. current flows from input terminal 3 through silicon controlled rectifier 8, connecting line 16, field and armature windings 15 and 17, respectively, of d.c. motor 4, inductor 18, and diode 7 to input terminal 2. It will be noted that both silicon controlled rectifiers 8 and 9 are simultaneously triggered into conduction by trigger pulses derived from unijunction trigger circuit 10. However, due to their oppositely poled arrangement, SCR 9 passes the positive half cycle while SCR 8 passes the negative half cycle of the a.c. signal input.

As previously mentioned, the magnitude of the d.c. energizing signal supplied to d.c. motor 4 is controlled by way of unijunction trigger circuit 10. That is, by varying the times SCR's 8 and 9 are gated open and closed the magnitude of the current flowing during each half cycle of the a.c. signal may be accurately determined thereby controlling the speed of d.c. motor 4. In practice a short time interval exists during which both SCR's 8 and 9 are gated "off" thus, opening the circuit between input terminals 2 and 3. Under this condition the current produced by the collapsing fields associated with the armature and field windings 15 and 17 is sufficient in magnitude to flow through diodes 7 and 6 and return to the field and armature windings 15 and 17 via connecting line 16 in a so-called "free wheeling current action". The larger the inductance associated with d.c. motor 4 the longer the time this generated current will continue to flow. Accordingly, absent a transient suppression network as provided in the present invention, when one of the SCR's is again triggered into conduction there exists a momentary short between a.c. line input terminals 2 and 3 and a large voltage transient therebetween is produced. For example, assume that about halfway during the positive half cycle of the a.c. input signal SCR 9 is triggered into conduction. This means that during approximately one half the positive half cycle of the a.c. signal SCR 9 is rendered nonconductive and current flows through diodes 6 and 7 in a manner previously discussed. Now when SCR 8 is suddenly triggered into conduction a momentary short exists between a.c. input terminals 2 and 3 via diode 6 and SCR rectifier 8 producing a large current transient. This results in a large transient current which will flow between the input terminals 2 and 3 until diode 6 recovers and commences to block the current flow. When diode 6 does recover, a large voltage transient will appear on input terminal 2 due to the distributed line circuit inductance.

Transient suppression network 19 of the present invention is designed to reduce such large transients between a.c. input terminals 2 and 3 due to the switching on and off of SCR rectifiers 8 and 9. A diode 21 is poled to be rendered conductive by the induced armature e.m.f. as the magnetic fields associated with the armature and field windings 15 and 17 collapse. This means that inductor 22 and diode 21 provide an effective shunt path for any generated motor current during the "free wheeling" interval such that the current is prevented from flowing through diodes 6 and 7. As a result, diodes 6 and 7 have sufficient time to recover during the off times of SCR's 8 and 9 to effectively open the circuit between input terminals 2 and 3 when one of the SCR's is gated on during the succeeding half cycle. For example, if line input terminal 2 is positive at the instant that the SCR's are triggered, the current path will be from terminal 2 through diode 6, line 16, diode 21, inductor 22, SCR 9 back to line terminal 3. Inductor 22 will limit the rate of rise of the transient current which flows until diode rectifier 21 recovers at which time the current will cease to flow through diode 21, but diode 20 now provides a path for the current flowing in inductor 22. Thus, it may be seen that the current transient is limited by inductor 22, and the voltage transient by diode 20.

Numerous modifications and departures from the specific apparatus described herein may be made by those skilled in the art without departing from the inventive concept of the invention. For instance, any number of like poled diodes may be employed in the voltage transient suppression network and other gate controlled full wave bridge rectifier arrangements may be utilized. Further, the invention may be employed with any type of inductive load including either series wound or shunt wound d.c. motors. Accordingly, the invention is to be construed as limited only by the spirit and scope of the appended claims.

What is claimed is:

1. A control circuit in a d.c. system having an inductive load and adapted to be excited by an a.c. signal source comprising:

gate controlled full wave rectifier means connected to the a.c. signal source for providing an energizing current;

means for coupling said d.c. energizing current to said inductive load;

means connected to said rectifier means for controlling the opening and closing of the gate controlled rectifier means to vary the magnitude of the d.c. energizing current supplied to the inductive load; and a transient suppression network connected in parallel with the inductive load for reducing signal transients arising during the switching of said gate controlled rectifier means comprising a plurality of series connected, like poled, unidirectional current conducting elements and an inductive impedance means connected in parallel with at least one of said unidirectional current conducting elements.

2. A transient suppression network as defined in claim 1 wherein said unidirectional current conducting elements comprise diodes.

3. A control circuit as defined in claim 2 wherein said inductive impedance means comprises an inductor connected in parallel with one of said diodes.

4. A control circuit as defined in claim 3 comprising in addition a serially connected resistor and capacitor connected in parallel with said inductive load.

* * * * *